United States Patent [19]

Shamie et al.

[11] Patent Number: 4,457,529
[45] Date of Patent: Jul. 3, 1984

[54] FOLDING TRICYCLE

[76] Inventors: Louis Shamie, Sam Shamie, both of 630 Ave. V, Brooklyn, N.Y. 11223

[21] Appl. No.: 405,377

[22] Filed: Aug. 5, 1982

[51] Int. Cl.³ .............................................. B62K 15/00
[52] U.S. Cl. ..................................... 280/278; 280/287
[58] Field of Search ............... 280/287, 278, 638, 639, 280/38, 39, 40, 642, 643, 645, 646, 42; 297/DIG. 4

[56] References Cited

U.S. PATENT DOCUMENTS

| | | | |
|---|---|---|---|
| 2,771,711 | 1/1957 | Yokomaki | 280/287 |
| 3,905,618 | 9/1975 | Miranda | 280/278 |
| 3,990,717 | 11/1976 | Best | 280/278 |
| 4,182,522 | 1/1980 | Ritchie | 280/278 |
| 4,202,561 | 5/1980 | Yonkers | 280/278 |

Primary Examiner—Joseph F. Peters, Jr.
Assistant Examiner—Mitchell J. Hill
Attorney, Agent, or Firm—McGlew and Tuttle

[57] ABSTRACT

A folding tricycle comprises a main frame having a rear frame member pivotally connected to a rear end thereof and a front fork pivotally connected to a front end thereof. A pair of wheels is rotatably mounted to the rear frame member and a front wheel is rotatably mounted to the front fork. Handle bars are pivotally mounted about a substantially horizontal axis to the front forks to move from a raised operating position to a lowered storage position. Locks are provided on the front and rear of the main frame member to lock the handle bars in their raised operable position and also to lock the rear frame member in an operable position, the rear frame member having a storage position with the wheels and rear frame member pivoted under the main frame member.

12 Claims, 4 Drawing Figures

4,457,529

FOLDING TRICYCLE

FIELD AND BACKGROUND OF THE INVENTION

The present invention relates, in general, to tricycles and, in particular, to a new and useful folding tricycle which has handle bars and rear wheels that can be folded to storage positions to make the tricycle compact for storage.

Various folding bicycles are known which have articulating members and locking means that permit the bicycle to be locked in an operable position for use. With the locking means disconnected, such bicycles can be folded in various ways to achieve a smaller overall size.

SUMMARY OF THE INVENTION

The present invention is drawn to a folding tricycle which has handle bars and a rear frame assembly which can be folded down and in, respectively, to achieve a small storage size for the tricycle.

Accordingly, an object of the present invention is to provide a folding tricycle having a main frame member, a rear frame member pivotally connected to and adjacent a rear end of said main frame member for movement from a rearward operable position to a forward storage position, a pair of rear wheels rotatably mounted to and adjacent opposite sides of said rear frame member, a front fork having a pair of spaced downwardly extending prongs and an upper portion supporting said prongs, a front wheel rotatably mounted to and between said prongs, a front wheel rotatably mounted to and between said prongs, said upper portion of said fork pivotally mounted about a substantially horizontal axis with the forward end of said main frame member for steering said wheel and for movement into an extreme stored position, first locking means connected to said main and rear frame members for locking said rear frame member into its operable position, a handle bar pivotally connected to said upper portion about a substantially horizontal axis for movement into an upper operable position to steer said front wheel and a lowered stored position, and second locking means connected to said upper portion and said handle bar for locking said handle bar in its operable position.

A further object of the invention is to provide a folding tricycle which is simple in design, rugged in construction and economical to manufacture.

For an understanding of the principles of the invention, reference is made to the following description of typical embodiments thereof as illustrated in the accompanying drawings.

DESCRIPTION OF THE PREFERRED EMBODIMENT

Figure 1:
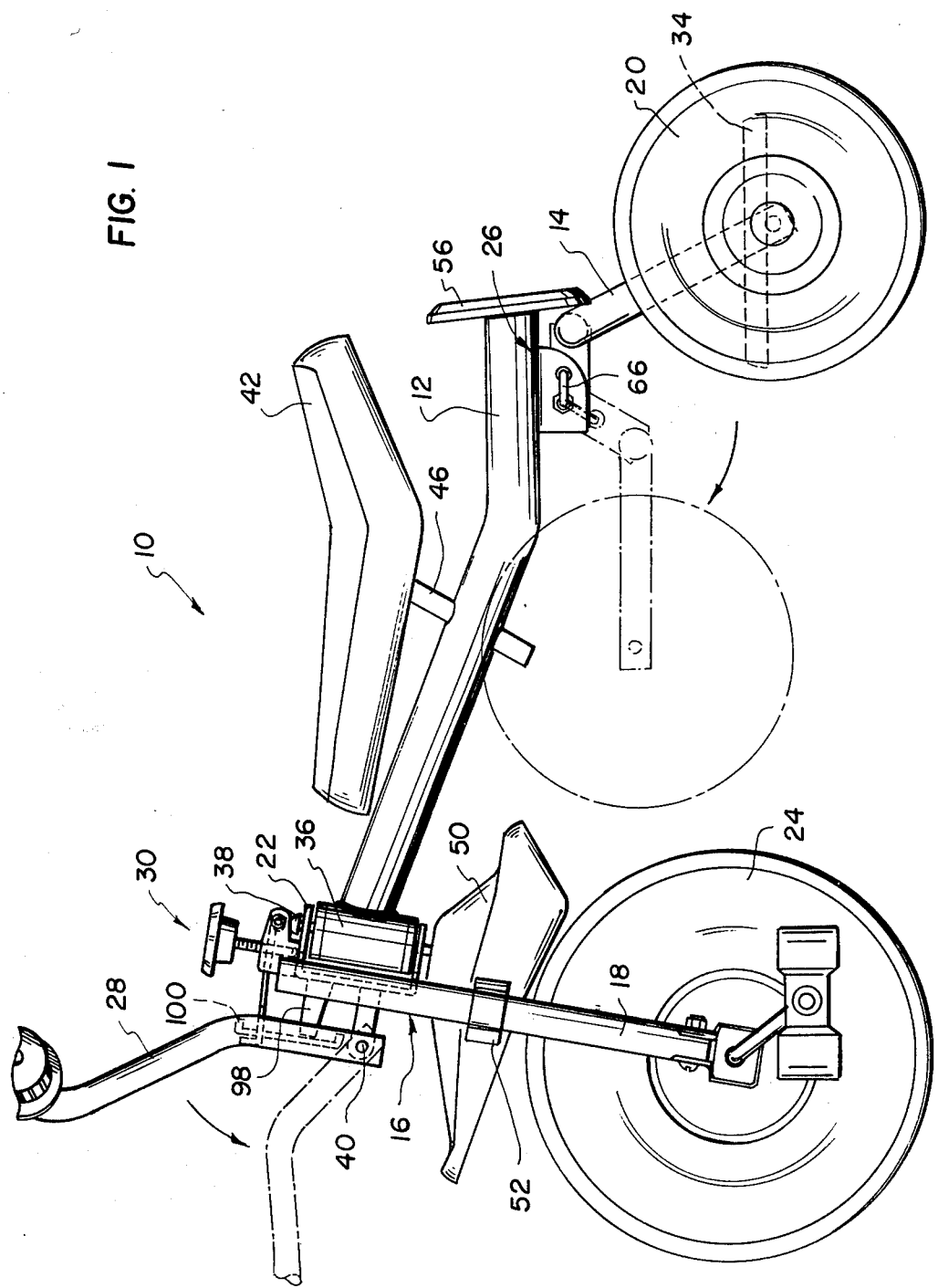
FIG. 1 is a side elevational view of the folding tricycle according to the invention in its unfolded operable state.
Figure 2:
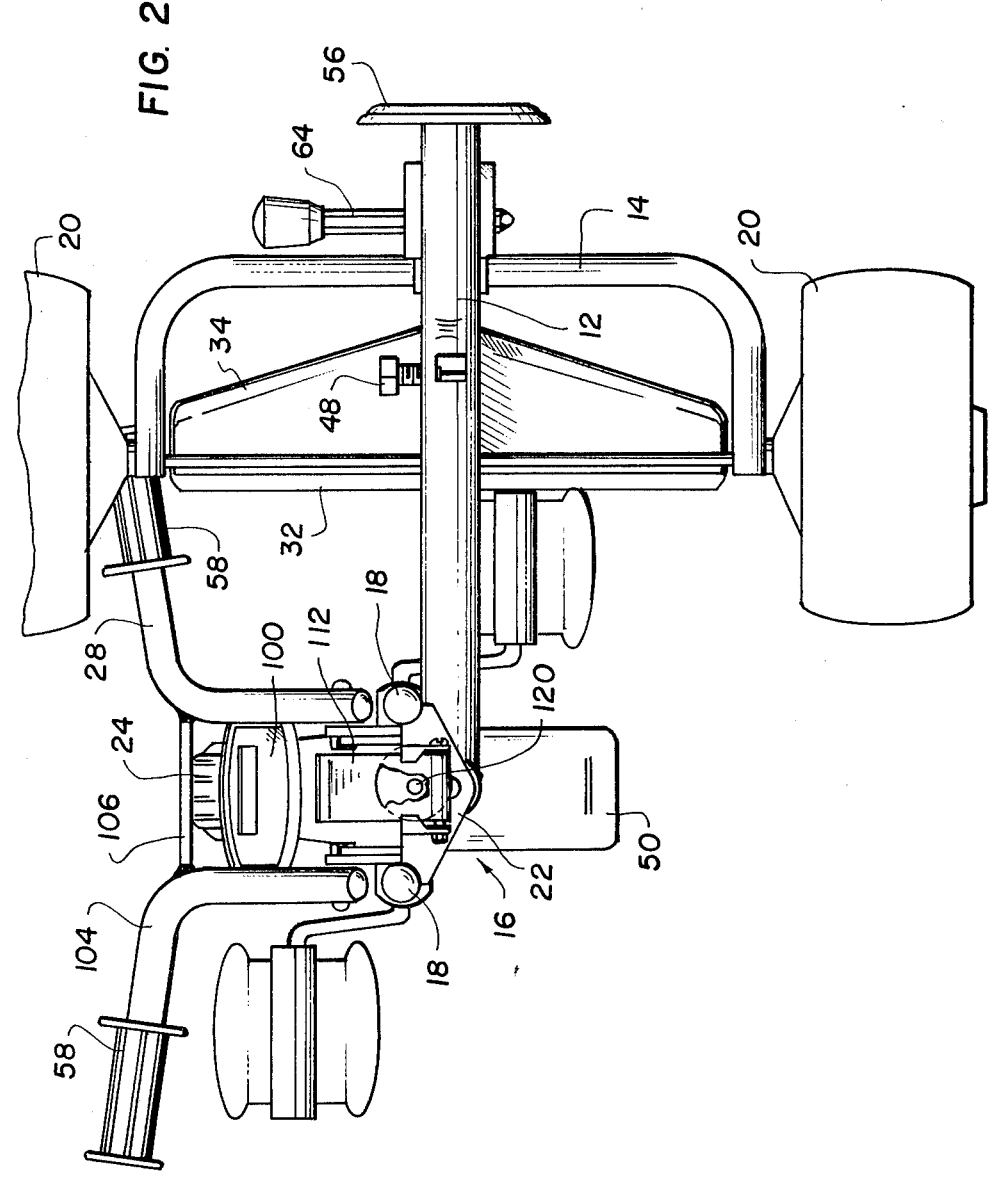
FIG. 2 is a top plan view of the folding tricycle according to the invention in a folded or stored state.

Referring to the drawings, in particular, the invention embodied therein in FIG. 1 comprises a folding tricycle generally designated 10 having a main frame 12 to which is pivotally connected a rear frame member 14 which is U-shaped as shown in FIG. 2. A pair of wheels 20 are rotatably mounted at opposite sides of main frame 14 by an axle 32. Rear frame member 14 may also include a foot rest 34 which is welded to the frame 14.

A front fork 16 comprising spaced prongs 18 which are connected to and extend downwardly from an upper portion 22, rotatably support a steering wheel 24 on a first horizontal axis. For steering upper portion 22 is rotatably mounted to the forward end of main frame 12 by a steering sleeve 36. Pin 38 rotatably mounts upper portion 22 to sleeve 36.

The connection of fork 16 to main frame member 12 not only permits steering of wheel 24 but also movement of fork 16 into an extreme storage position as shown in FIG. 2. A handle bar 28 is pivotally mounted about a second horizontal axis at 40, to upper portion 22 of fork 16. The first and second horizontal axes are parallel to each other, as shown in FIG. 1. Locking means 30, to be described in greater detail, lock handle bars 28 in its raised position shown in FIG. 1 and also permits unlocking of the handle bars so that they could move downwardly into their storage position shown in FIG. 2.

Locking means 26 are also provided at the rear of frame member 12 to lock rear frame member 14 in its operable position shown in FIG. 1 and permit the rear frame member to be moved into its storage position shown in FIG. 2.

The storage position is also shown in phantom line in FIG. 1 and arrows indicate the movement of the handle bars and rear frame member toward their storage position.

As shown in FIG. 1, a seat 42 is connected through a rod 46 to main frame 12 and fixed, as shown in FIG. 2, by a bolt 48. A fender 50 may also be connected above the steering wheel 24 by connecting members 52 that embrace prongs 18. A reflector 56 is connected to the rear end of main frame member 12 as a safety feature.

As shown in FIG. 2, handle bar 28 includes handles 58. These handle bars are such a length so that in either extreme storage position of fork 16, the handle portion 58 can be wedged against an inner surface of one of the rear wheels 20 to retain the tricycle in its stored position.

Figure 3:
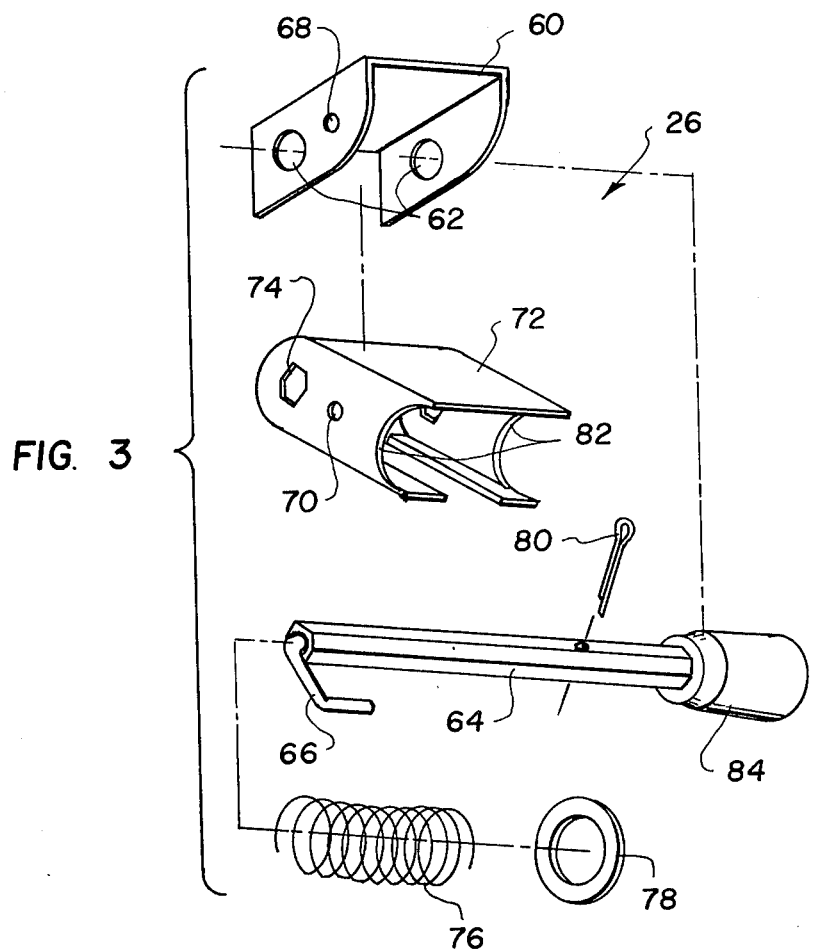
FIG. 3 is an exploded perspective view of the first locking mechanism for locking the rear frame assembly of the tricycle in its operable position and for releasing the assembly for movement into its storage position.

Referring now to FIG. 3, rear locking means 26 comprise a first bracket 60 having flanges through which aligned openings 62 extend. Openings 62 are of a size to permit free sliding and rotational movements of polygonal bar 64. Bar 64 includes a hooked end 66 which is shaped to engage locking opening 68 of bracket 60 or a locking opening 70 of a second bracket 72. Second bracket 72 has flanges which include polygonal openings 74 that are aligned and adpated to receive polygonal bar 64. A slidable but non-rotatable engagement is thus established between bar 64 and second bracket 72.

A spring 76 and washer 78 with cotter pin 80 are engaged on bar 64 to bias the bar in its locked position.

In the operable position, as shown in FIG. 1, openings 68 and 70 are aligned with brackets 72 nested within brackets 60. Hook end 66 thus engages the aligned openings 68, 70 to lock the rear frame members 14 in its operable position. It is noted that bracket 60 is welded to the bottom of the rear end of main frame member 12 and circular recesses 82 of bracket 72 are welded to rear frame member 14.

To unlock the rear assembly, a handle member 84 at the end of bar 64 is moved downwardly as shown in FIG. 2 to disengage hook 66 from openings 68, 70. This permits downward rotation of bracket 72 and its connected rear assembly. Since bar 64 rotates with bracket 72, a release of handle 84 permits re-entry of hook 66 into opening 70. This is shown in phantom line in FIG. 1.

Figure 4:
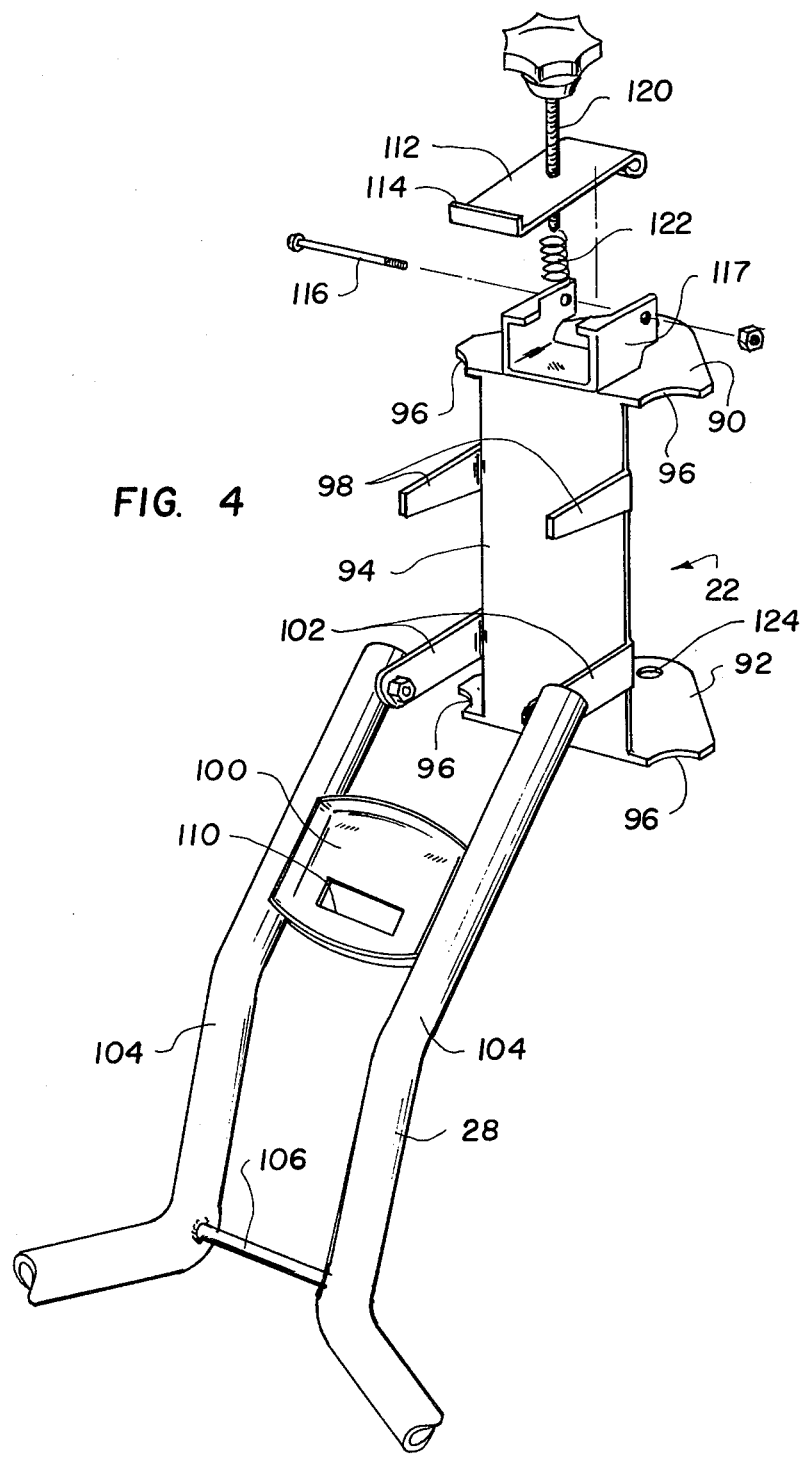
FIG. 4 is a perspective partially exploded view of the second locking mechanism for locking the handle bars in their operable position and releasing the handle bars for movement into their stored position.

Referring to FIG. 4, the upper fork portion 22 includes flanges 90, 92 and a cross member 94. Circular recesses 96 are provided in flanges 90 and 92 so that upper portion 22 can be welded to the forks 18. Cross member 94 also includes stops 98 which are of a length and position to abut a fork plate 100 at the shaded areas shown. This abutment holds handle bar 28 in its upper operable position, thus permitting movement as shown in FIG. 1. Lower extensions 102 are also provided on cross member 94 which pivotally hold handle bar 28. Handle bar 28 comprises a pair of handle bar members 104 which carry fork plate 100 therebetween. For additional support, a cross pin 106 also connects handle bar members 104 together. Cross pin 106 is positioned, as shown in FIG. 2, so that it engages an outer surface of front wheel 24 in the stored position of the tricycle. This also renders the folded tricycle more rigid for handling and storage.

To lock the handle bars 28 in its raised position, an opening 110 is provided in fork plate 100 which is engaged by a locking plate 112 having a hook portion 114. Locking plate 112 is pivotally mounted on a pin 116 to a third bracket 117 that is welded to the top of flange 90. Projections 118 keep plate 112 from rising too far above its locked position. Plate 112 is raised into its locked position by a screw 120 with a handle and a biasing spring 122 which keeps locking plate 112 in its raised position. To lower handle bars 28, plate 112 is released by turning screw 120 and manually pushing plate 112 downwardly against the bias of spring 122. Openings 124 (one of which is shown) are provided in flanges 90 and 92 for receiving pin 38.

For extra structural integrity, fork plate 100 is dish-shaped as shown.

It is noted that FIG. 2 is shown with seat 42 missing for clarity.

While specific embodiments of the invention have been shown and described in detail to illustrate the application of the principles of the invention, it will be understood that the invention may be embodied otherwise without deparing from such principles.

What is claimed is:

1. A folding tricycle comprising:
   a main frame member;
   a rear frame member pivotally connected to and adjacent a rear end of said main frame member for movement from a rearward operable position to a forward stored position;
   a pair of rear wheels rotatably mounted to and adjacent opposite sides of said rear frame member, each having an inner surface;
   a front fork having an upper portion and a pair of spaced downwardly extending prongs connected to said upper portion;
   a front wheel rotatably mounted to and between said prongs on a first horizontal axis;
   said upper portion of said fork being pivotally connected to said main frame member for pivotal movement to steer said front wheel and for movement into at least one extreme stored position;
   first locking means connected to said main and rear frame members for locking said rear frame members into its operable position;
   a handle bar pivotally connected to said upper portion about a second horizontal axis for movement from an upper operable position, said first and second axes being parallel to each other to a lower stored position; and
   second locking means connected to said upper portion and said handle bar for locking said handle bar in its operable position;
   said handle bar including a pair of handle portions extending outwardly, said handle portions having a length so that with said handle bar and said rear frame member in their stored positions and said upper portion of said fork in its extreme stored position, one of said handle portions engages under the inner surface of one of said rear wheels;
   said handle bar comprising said pair of handle bar portions each with a handle at an end thereof and a cross bar connected between said handle bar portions at a location to engage said cross bar against said front wheel with said handle bar in its stored position, and said upper portion of said fork in its extreme stored position.

2. A folding tricycle comprising:
   a main frame member;
   a rear frame member pivotally connected to and adjacent a rear end of said main frame member for movement from a rearward operable position to a forward stored position;
   a pair of rear wheels rotatably mounted to and adjacent opposite sides of said rear frame member;
   a front fork having an upper portion and a pair of spaced downwardly extending prongs connected to said upper portion;
   a front wheel rotatably mounted to and between said prongs;
   said upper portion of said fork being pivotally connected to said frame member for pivotal movement to steer said front wheel and for movement into at least one extreme stored position;
   first locking means connected to said main and rear frame members for locking said rear frame member into its operable position;
   a handle bar pivotally connected to said upper portion about a substantially horizontal axis for movement from an upper operable position to a lower stored position; and
   second locking means connected to said upper portion and said handle bar for locking said handle bar in its operable position;
   said first locking means comprising a first bracket connected to said main frame member having a pair of downwardly extending flanges with aligned openings therethrough, a second bracket connected to said rear frame member having aligned polygonal openings aligned with said openings of said first bracket, a polygonal bar slidably engaged in said polygonal openings and rotatable and slidable in said openings of said first bracket for co-rotation of said polygonal bar and said second bracket, a locking opening in one of said first bracket flanges and a locking opening in said second bracket, each said locking opening being alignable in said operable position of said rear frame member and disaligned in said stored position of said rear frame member, a hook end connected to said polygonal bar and engageable with both of said locking openings in said operable position of said rear frame member and engaged only with said locking opening of said second bracket in said stored position of said rear frame member.

3. A folding tricycle according to claim 2, including a spring engaged on said polygonal bar for biasing said polygonal bar toward its position with said hooked end in at least one of said locking openings.

4. A folding tricycle according to claim 2, wherein said second locking means comprises a third bracket connected to said upper portion of said fork, a locking plate pivotally mounted to said third bracket and a screw for moving said locking plate into a locked position and permitting movement of said locking plate into an unlocked position, a fork plate connected to said handle bar having an opening therethrough for receiving said locking plate in said operable position of said handle bar.

5. A folding tricycle comprising:
a main frame member;
a rear frame member pivotally connected to and adjacent a rear end of said main frame member for movement from a rearward operable position to a forward stored position;
a pair of rear wheels rotatably mounted to and adjacent opposite sides of said rear frame member;
a front fork having an upper portion and a pair of spaced downwardly extending prongs connected to said upper portion;
a front wheel rotatably mounted to and between said prongs;
said upper portion of said fork being pivotally connected to said main frame member for pivotal movement to steer said front wheel and for movement into at least one extreme stored position;
first locking means connected to said main and rear frame members for locking said rear frame member into its operable position;
a handle bar pivotally connected to said upper portion about a substantially horizontal axis for movement from an upper operable position of said fork to a lower stored position; and
second locking means connected to said upper portion and said handle bar for locking said handle bar in its operable position;
said second locking means comprising a third bracket connected to said upper portion of said fork, a locking plate pivotally mounted to said third bracket and a screw for moving said locking plate into a locked position and permitting movement of said locking plate into an unlocked position, a fork plate connected to said handle bar having an opening therethrough for receiving said locking plate in said operable position of said handle bar.

6. A folding tricycle according to claim 5, wherein said handle bar includes a pair of handle portions extending outwardly, said handle portions having a length so that with said handle bar and said rear frame member in their stored positions and said upper portion of said fork in its extreme stored position, said handle member engages under and inner surface of one of said rear wheels.

7. A folding tricycle according to claim 5, wherein said first locking means comprises a first bracket connected to said main frame member having a pair of downwardly extending flanges with aligned openings therethrough, a second bracket connected to said rear frame member having aligned polygonal openings alinged with said openings of said first bracket, a polygonal bar slidably engaged in said polygonal openings and rotatable and slidable in said openings of said first bracket for co-rotation of said polygonal bar and said second bracket, a locking opening in one of said first bracket flanges and a locking opening in said second bracket, said locking opening being alignable in said operable position of said rear frame member and disaligned in said stored position of said rear frame member, a hook end connected to said polygonal bar and engageable with both of said locking openings in said operable position of said rear frame member and engaged only with said locking opening of said second bracket in said stored position of said rear frame member.

8. A folding tricycle according to claim 5, including a spring engaged on said screw for biasing said locking plate into its locked position.

9. A folding tricycle according to claim 5, wherein said fork plate is dish-shaped.

10. A folding tricycle according to claim 5, wherein said upper portion of said fork comprises a cross member and a pair of flanges, said main frame includes a sleeve connected to a forward end thereof rotatably mounted between said flanges of said upper portion, and at least one stop extending forwardly of said cross member and engageable with said fork plate in said operable position of said handle bar.

11. A folding tricycle according to claim 10, including at least one lower extension extending forwardly of said cross member pivotally connected to said handle bar.

12. A folding tricycle according to claim 11, wherein said prongs are connected to said pair of flanges of said upper portion.

* * * * *